(12) United States Patent  
Hsiao

(10) Patent No.: US 11,138,695 B2  
(45) Date of Patent: Oct. 5, 2021

(54) METHOD AND DEVICE FOR VIDEO PROCESSING, ELECTRONIC DEVICE, AND STORAGE MEDIUM

(71) Applicant: ONEPLUS TECHNOLOGY (SHENZHEN) CO., LTD., Shenzhen (CN)

(72) Inventor: HsiChun Hsiao, Shenzhen (CN)

(73) Assignee: ONEPLUS TECHNOLOGY (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 16/724,669

(22) Filed: Dec. 23, 2019

(65) Prior Publication Data

US 2020/0126193 A1    Apr. 23, 2020

Related U.S. Application Data

(63) Continuation of application No. PCT/CN2017/092025, filed on Jun. 20, 2018.

(30) Foreign Application Priority Data

Jun. 21, 2017 (CN) .......................... 201710477150.5

(51) Int. Cl.
*G06T 5/00* (2006.01)
*G06T 7/90* (2017.01)
*G06K 9/00* (2006.01)

(52) U.S. Cl.
CPC .......... *G06T 5/002* (2013.01); *G06K 9/00234* (2013.01); *G06K 9/00248* (2013.01);
(Continued)

(58) Field of Classification Search
CPC .......... G06T 5/002; G06T 7/90; G06T 5/009; G06T 2207/30201; G06T 2207/30204;
(Continued)

(56) References Cited

U.S. PATENT DOCUMENTS

2008/0187184 A1* 8/2008 Yen .......................... G06T 5/008  
382/118  
2009/0273667 A1    11/2009 Nozaki et al.  
(Continued)

FOREIGN PATENT DOCUMENTS

CN    103325089 A    9/2013  
CN    104735362 A    6/2015  
(Continued)

OTHER PUBLICATIONS

Written Opinion and International Search Report for PCT/CN2018/092025, dated Sep. 12, 2018.
(Continued)

*Primary Examiner* — Phuoc Tran  
(74) *Attorney, Agent, or Firm* — Marshall, Gerstein & Borun LLP

(57) ABSTRACT

The present disclosure provides a method for video processing. The method includes: obtaining a current image frame and a previous image frame in a video to be processed based on a preset sampling frequency value; obtaining a first skin tone weight map of the current image frame and a second skin tone weight map of the previous image frame; superimposing the first skin tone weight map and the second skin tone weight map to obtain a third skin tone weight map; and superimposing a first luminance map of the current image frame and a second luminance map based on the third skin
(Continued)

tone weight map to obtain a second image. The first luminance map is a luminance map of the current image frame, and the second luminance map is a map obtained after the first luminance map is smoothed.

18 Claims, 5 Drawing Sheets

(52) U.S. Cl.
CPC ............... G06T 5/009 (2013.01); G06T 7/90 (2017.01); *G06T 2207/30201* (2013.01); *G06T 2207/30204* (2013.01)

(58) Field of Classification Search
CPC ........... G06K 9/00234; G06K 9/00248; H04N 5/23216; H04N 5/23229
See application file for complete search history.

(56) References Cited

U.S. PATENT DOCUMENTS

| | | | |
|---|---|---|---|
| 2010/0054549 A1* | 3/2010 | Steinberg | H04N 5/2354 382/118 |
| 2012/0008002 A1 | 1/2012 | Bigioi et al. | |
| 2012/0120283 A1 | 5/2012 | Capata et al. | |
| 2017/0339409 A1* | 11/2017 | Socek | H04N 19/167 |
| 2018/0174370 A1* | 6/2018 | Chen | G06T 15/005 |

FOREIGN PATENT DOCUMENTS

| | | |
|---|---|---|
| CN | 105608677 A | 5/2016 |
| CN | 106447638 A | 2/2017 |
| CN | 106447642 A | 2/2017 |
| CN | 106780311 A | 5/2017 |
| CN | 107172354 A | 9/2017 |
| EP | 3068122 A1 | 9/2016 |

OTHER PUBLICATIONS

Extended European Search Report for Application No. 18820597.5, dated Jan. 29, 2021.
Menser B et al.: "Face detection and tracking for video coding applications", Signals, Systems and Computers, 2000. Conference Record of the Thirty-Fourth Asilomar Conference on Oct. 29-Nov. 1, 2000, Piscataway, NJ, USA, IEEE, Oct. 29, 2000, pp. 49-53 vol. 1, XP032142571, DOI: 10.1109/ACSSC.2000.910916 ISBN: 978-0-7803-6514-8.
Office Action Application No. 201710477150.5 to China, dated Apr. 3, 2019.

* cited by examiner

METHOD AND DEVICE FOR VIDEO PROCESSING, ELECTRONIC DEVICE, AND STORAGE MEDIUM

The present application is a continuation application of International Application No. PCT/CN2018/092025, filed on Jun. 20, 2018, which claims priority to Chinese Patent Application No. 201710477150.5, filed on Jun. 21, 2017 with China National Intellectual Property Administration, entitled "METHOD AND DEVICE FOR VIDEO PROCESSING, ELECTRONIC DEVICE, AND STORAGE MEDIUM", the content of which is incorporated herein by reference in its entirety.

TECHNICAL FIELD

The present disclosure relates to the field of image processing, and more particularly, to a method and a device for video processing, an electronic device, and a storage medium.

BACKGROUND

In an existing previewing process in video or photo shooting, beautification will be performed on a captured video. The existing beautification technology mainly relies on information on a position of a facial contour relative to facial features to obtain a facial block requiring for beautification. The smoothed image is then superimposed on an original image to achieve beautification after the facial block requiring for beautification is smoothed. However, it may happen that beautification of the image frame to be processed in a certain frame may be not performed due to an occlusion of the facial features, a failure of a face detection, or the like, which may cause a flicker or a sporadic beautification effect of a previewed image or a captured video.

SUMMARY

In view of the above, embodiments of the present disclosure aim at providing a method and a device for video processing, an electronic device and a storage medium to improve the above problems.

In a first aspect, the present disclosure provides a method for video processing. The method includes: obtaining a current image frame and a previous image frame in a video to be processed based on a preset sampling frequency value; obtaining a first skin tone weight map of the current image frame and a second skin tone weight map of the previous image frame; superimposing the first skin tone weight map and the second skin tone weight map to obtain a third skin tone weight map; and superimposing a first luminance map of the current image frame and a second luminance map to obtain a second image. The first luminance map is a luminance map of the current image frame, and the second luminance map is a map obtained after the first luminance map is smoothed.

In a second aspect, the present disclosure provides a device for video processing. The device includes: a first obtaining unit configured to obtain a current image frame and a previous image frame in a video to be processed based on a preset sampling frequency value; a second obtaining unit configured to obtain a first skin tone weight map of the current image frame and a second skin tone weight map of the previous image frame; a first superimposing unit configured to superimpose the first skin tone weight map and the second skin tone weight map to obtain a third skin tone weight map; and a second superimposing unit configured to superimpose a first luminance map of the current image frame and a second luminance map to obtain a second image. The first luminance map is a luminance map of the current image frame, and the second luminance map is a map obtained after the first luminance map is smoothed.

In a third aspect, the present disclosure provides an electronic device, the electronic device includes a processor and a memory coupled to the processor through a bus, and the memory stores a program. The processor calls the program stored in the memory through the bus to execute the method above.

In a fourth aspect, the present disclosure provides a storage medium. The storage medium stores non-volatile program instructions executable by a processor. The program instructions cause the processor to execute the method above.

The beneficial effect of the present disclosure is as follows.

The present disclosure provides the method and the device for video processing, the electronic device and the storage medium. The current image frame and the previous image frame is sampled according to the preset sampling frequency value. The first skin tone weight map of the current image frame and the second skin tone weight map of the previous image frame are obtained. The first skin tone weight map is superimposed on the second skin tone weight map to obtain the third skin tone weight map. According to the third skin tone weight map, the first luminance map of the current image frame is superimposed on the second luminance map to obtain the second image. A skin tone portion of the second image is smoothed, and a non-skin tone portion of the second image is kept original. The current image frame is sampled at the preset sampling frequency value, and a beautification is performed on the current image frame by detecting a skin tone portion of the current image frame. It is avoided that beautification cannot be implemented because the facial features cannot be detected. Meanwhile, a skin tone weight map of the current image frame is superimposed on a skin tone weight map of the previous image frame to be present with the beautification effect continuously, which can avoid a flicking or sporadic beautification effect of an image caused by changes in ambient light during a process of previewing or camera capturing.

Other features and advantages of the present disclosure will be depicted in the following description, and part of them will become apparent in the description or be understood by implementing embodiments of the present disclosure. Purposes and other advantages of the present disclosure can be achieved by and obtained from structures specifically pointed out in the written description, claims, and drawings.

BRIEF DESCRIPTION OF DRAWINGS

In order to illustrate technical solutions of embodiments of the present disclosure, the accompanying drawings used in the embodiments are introduced hereinafter. It should be understood that these drawings only illustrate some embodiments of the present disclosure and should not be regarded as limitations to the scope. Those skilled in the art can also obtain other drawings without paying any creative effort.

DESCRIPTION OF EMBODIMENTS

Figure 1:
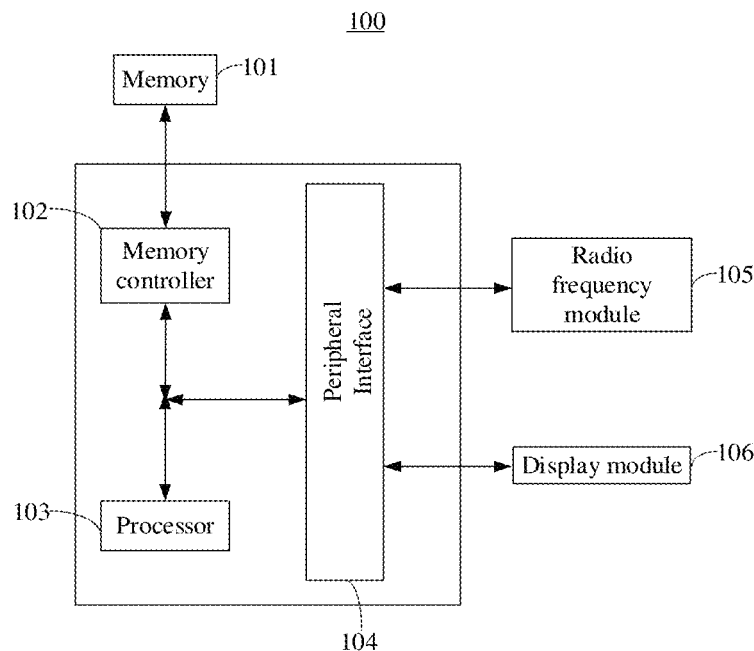
FIG. 1 is a block diagram of an electronic device according to an embodiment of the present disclosure.

Those skilled in the art have long sought a tool or method to alleviate this problem.

In view of this, after long-term exploration and trials, as well as multiple experiments and efforts, designers of the present disclosure have continuously reformed and innovated, to obtain a safety authentication method, device and system shown in this scheme.

In order to make the purpose, technical solutions, and advantages of embodiments of the present disclosure clearer, technical solutions in the embodiments of the present disclosure will be clearly and completely described with reference to the accompanying drawings in the embodiments of the present disclosure. Obviously, the described embodiments are merely parts, but not all, of the embodiments of the present disclosure. Components of the embodiments of the disclosure, generally described and illustrated in figures herein, can be arranged and designed in a variety of different configurations. Therefore, the following detailed description of the embodiments of the present disclosure provided in the drawings is not intended to limit the scope of the claimed disclosure, but merely represents selected embodiments of the present disclosure. Based on the embodiments of the present disclosure, all other embodiments obtained by those skilled in the art without making creative efforts fall within the protection scope of the present disclosure.

It should be noted that similar reference numerals and letters indicate similar items in the following drawings, so once one item is defined in one drawing, it does not need to be further defined and explained in subsequent drawings. Meanwhile, in the description of the present disclosure, the terms "first", "second", and the like are only used to distinguish descriptions, and cannot be understood to indicate or imply relative importance. A process of taking pictures with a camera can be regarded as an acquisition process for a video, e.g., a video acquisition before a photo acquisition or a video acquisition of a video recording operation, since no image has been successfully captured. Sometimes, it is needed to perform beautification on each image frame or several image frames acquired during a video acquisition process.

In the prior art, positions of the facial features are usually determined by a face model, and then a beautification for an image is implemented. When the facial features are shield or one image frame that needs to be performed with the beautification is a profile, it is easily to obtain mistake positions of the facial features, or even to be unable to obtain positions of the facial features, causing being unable to implement the beautification for this image frame. Therefore, a beautification effect of an image acquired during shooting video or viewing previewed images before taking pictures is unable to keep stable or is flicking.

In view of this, a method and a device for video processing, an electronic device, and a storage medium according to embodiments of the present disclosure have been proposed.

FIG. 1 shows a block diagram of an electronic device 100 that can be applied to a method and device for video processing according to an embodiment of the present disclosure. As shown in FIG. 1, the electronic device 100 includes a memory 101, a memory controller 102, one or more processors 103 (only one processor is shown in the figure), a peripheral interface 104, a radio frequency module 105, a display module 106, and the like. These components communicate with each other through one or more communication bus/signal lines 107.

The memory 101 can be configured to store software programs and modules, such as program instructions/modules corresponding to the method and the device for video processing in the embodiments of the present disclosure. The processor 103 executes various function applications and data processing (such as the method and the device for video processing provided by the embodiments of the present disclosure) by running the software programs and modules stored in the memory 101.

The memory 101 can include a high-speed random access memory, and can further include a non-volatile memory, such as one or more magnetic storage devices, a flash memory, or other non-volatile solid-state memory. Access to the memory 101 by the processor 103 and other possible components can be performed under control of the memory controller 102.

The peripheral interface 104 couples various input/output devices to the processor 103 and the memory 101. In some embodiments, the peripheral interface 104, the processor 103, and the memory controller 102 can be implemented in a single chip. In other embodiments, they can be implemented by separate chips.

The radio frequency module 105 is configured to receive and transmit electromagnetic waves, and to achieve mutual conversion between electromagnetic waves and electrical signals, thereby communicating with a communication network or other equipment.

The display module 106 provides a display interface between the electronic device 100 and a user. Specifically, the display module 106 displays image outputs to the user, and content of these image output can include text, graphics, video, and any combination thereof.

It can be understood that the structure shown in FIG. 1 is merely illustrative, and the electronic device 100 can further include more or fewer components than those shown in FIG. 1, or have a different configuration from that shown in FIG. 1. Each component shown in FIG. 1 can be implemented by hardware, software, or a combination thereof.

Figure 2:
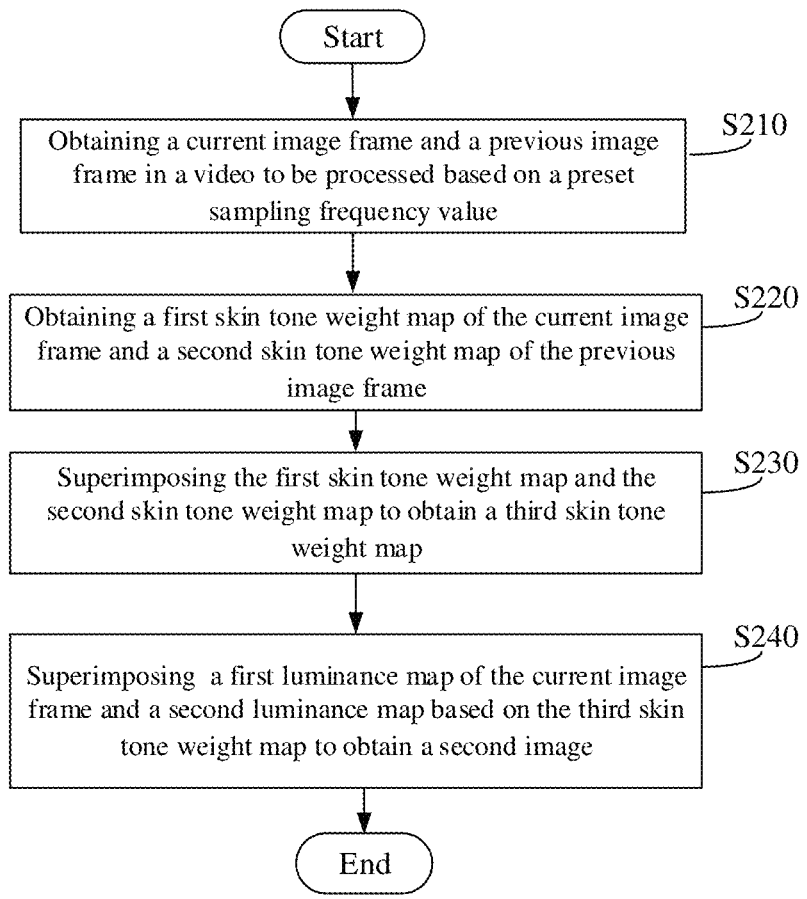
FIG. 2 is a flowchart of steps of a method for video processing according to a first embodiment of the present disclosure.

Referring to FIG. 2, a flowchart of steps of a method for video processing according to a first embodiment of the present disclosure is shown. The method includes following steps.

At step S210, a current image frame and a previous image frame in a video to be processed are obtained based on a preset sampling frequency value.

When taking pictures, a process before pressing a capture key is equivalent to a video acquisition process. An image capture device is required to acquire and display each image frame. When displaying live captured images, it is sometimes necessary to perform beautification on an acquired image and then display it. For example, the user usually moves multiple times in order to get a better shooting effect when shooting with a camera having beautification function. The dynamic image with performed beautification is displayed on the image capture device (such as a mobile phone) before the shooting button pressed.

In some other cases, for example, it is also necessary to perform the beautification on each obtained image frame or every few obtained image frames to achieve a beautification effect for the obtained video during video recording.

The current image frame and the previous image frame may be obtained during a photographing process, or may be obtained during a video shooting process.

Figure 3:
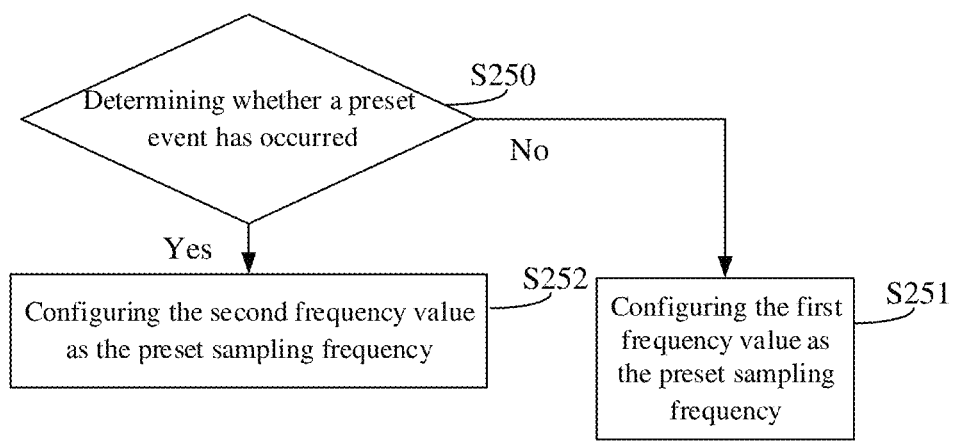
FIG. 3 is a step flowchart of step S220 of the method for video processing according to the first embodiment of the present disclosure.

It is necessary to perform the beautification on the current image frame after obtaining the current image frame. Each image frame can be sampled by configured a preset sampling frequency to achieve the beautification process for each image frame. The preset sampling frequency can also be configured in such a manner that the sampling is performed once every three image frames in order to reduce computing loading of the processor. In other embodiments, the preset sampling frequency can also be configured as other values according to specific requirements. The preset sampling frequency can be an initial sampling frequency, and a frequency value of the sampling frequency is an initial value. For example, which sampling frequency should be configured to sample the video is difficult to exactly configure at the first time of image sampled because there is no image is captured. Therefore, after performing sampling based on the preset sampling frequency, the preset sampling frequency is appropriately adjusted based on the captured image to adapt to different scenarios and requirements. An updating step can be performed after step S210 and before a next sampling process. Reference can be made to step S250, step S251, and step S252 that are shown in FIG. 3 for specific update methods.

At step S250, it is determined whether a preset event has occurred.

The preset sampling frequency can be configured artificially. In the process of video acquisition, the preset sampling frequency needs to be adjusted based on the situation of the preset event, so as to avoid that the image frames of the video processed by the beautification process cannot be presented continuously.

The preset event includes at least one of a facial block, a first skin tone value range, or the number of faces. An implementation manner for determining whether the preset event has occurred can be determining whether at least one of the facial block, the first skin tone value range, or the number of faces has changed. The first skin tone value range is a skin tone value range corresponding to the current image frame.

A face recognition is performed on the current image frame, so as to mark and obtain the change of the facial block from the current image frame.

In one embodiment, whether the facial block has changed can be determined by determining whether a position of the facial block has changed. Specifically, one position is selected from the facial block of the current image frame as a marked position, for example, a center position of the facial block of the current image frame is selected as the marked position; and a marked position of the facial block in the previous image frame is obtained. When a change rate between the marked position of the facial block in the current image frame and the marked position of the facial block in the previous image frame is greater than a preset value, it is determined that the facial block has changed. The preset value can be artificially configured according to requirements and specific conditions.

In another embodiment, it is determined whether the facial block has changed, or whether a size of the facial block has changed. When taking photos, there are different distances between an object to be shot and a photographing device, and sizes of the facial block of the obtained current image frame are also different. For example, when the face gets closer to the cell phone, the facial block in the obtained current image frame is larger; and when the user moves the cell phone to make the face be relatively far away from the cell phone, the facial block of the obtained current image frame is relatively small.

The first skin tone value range is a skin tone value range of the current image frame. The skin tone value range of the current image frame can be defined by a distribution range of each pixel value of the facial block of the current image frame in a YUV or HSV/HSI color space model. The first skin tone value range is changed due to a change in an ambient light source or white balance (AWB), such as the surrounding light becomes stronger or weaker.

A specific implementation is to calculate whether change in value exceeds a preset range by comparing the skin tone value range of the current image frame with a skin tone value range of the previous image frame. If the change in value exceeds the preset range, it is determined that the first skin tone value range has changed. If the change in value does not exceed the preset range, it is determined that the first skin tone value range has not changed, even if the first skin tone value range is different from the second skin tone value range.

The number of faces can be determined by comparing the number of facial blocks in the current image frame with the number of facial blocks in the previous image frame. If the number is different, it is determined that the number of faces has changed.

In at least one of the above three embodiments, it is determined that the preset event has occurred if at least one of them has occurred.

It should be noted that the above three embodiments are not determined in order. It is possible to firstly determine whether the facial block has changed. When the determining result of the facial block is Yes, it is determined that the preset event has occurred. When the determining result of the facial block is No, it is determined whether the first skin tone value range has changed. When the determining result of the first skin tone value range is Yes, it is determined that the preset event has occurred. When the determining result of the first skin tone value range is No, it is determined whether the number of faces has changed. When the determining result of the number of faces is Yes, it is determined that the preset event has occurred. When the determining result of the number of faces is No, it is determined that the preset event has not occurred. It may also be determined in other orders in other embodiments.

At step S251, the first frequency value is configured as the preset sampling frequency value in a case where the preset event has not occurred.

None of the facial block, the first skin tone value range, and the number of faces has changed therefore determined that the preset event has not occurred and the preset sampling frequency value is updated to the first frequency value. It means that the current image frame is relatively stable since the preset event has not occurred. In one embodiment, the first frequency value can be the same as the preset frequency value. In another embodiment, the first frequency value can be smaller than the preset frequency value. When the next image sampled, the first frequency value is configured as the preset sampling frequency value for sampling. For example, when the user photographs with a camera with a beautification function, the image is sampled and processed at a preset sampling frequency of every two image frames by the camera with the beautification function configured on the electronic device. The preset event is determined to have not occurred and therefore the preset frequency of sampling every two image frames at one time can be changed to the first frequency value of sampling every three image frames at one time. In the next sampling process, the first frequency value of sampling every three image frames at one time is configured as the preset frequency value, and the next image frame after the current image frame will be sampled at the preset frequency value. The first frequency value also can be configured as the preset sampling frequency value, and the next sampling is still performed at the sampling frequency of every two image frames at one time.

At step S252, when the preset event has occurred, a second frequency value is configured as the preset sampling frequency value, where the second frequency value is greater than the first frequency value. When it is determined that the preset event has occurred, it is determined that at least one of the facial blocks, the first skin tone value range, or the number of faces has changed, the preset sampling frequency value is updated to the second frequency value. When the next image sampled, the second frequency value is configured as the preset sampling frequency value for sampling. For example, when the user photographs with a camera with a beautification function, the image is sampled and processed at a preset sampling frequency of every two image frames by the camera with the beautification function configured on the electronic device. The first skin tone value range of the current image frame compared with the skin tone value range of the previous image frame has changed and exceeds the preset range when the surrounding light becomes stronger. The preset event is determined to have occurred and therefore the preset frequency of sampling every two image frames at one time is changed to a second frequency value of sampling each image frame at one time. In the next sampling process, the second frequency value of sampling each image frame at one time is configured as the preset sampling frequency value, and the next image frame of the current image frame will be sampled at the preset sampling frequency value.

At step S220, a first skin tone weight map of the current image frame and a second skin tone weight map of the previous image frame are obtained.

At step S230, the first skin tone weight map and the second skin tone weight map are superimposed to obtain a third skin tone weight map.

At step S240, a first luminance map of the current image frame and the second luminance map of the current image frame are superimposed based on the third skin tone weight map to obtain a second image. The first luminance map is a luminance map of the current image frame, and the second luminance map is a map obtained after the first luminance map is smoothed.

It should be noted that reference can be made to subsequent embodiments for specific implementations of steps S210 to S240 in the first embodiment, details are not described herein again.

The method for video processing according to the first embodiment of the present disclosure does not need to obtain position information of facial features of the facial block. The beautification is performed on the current image frame by sampling a skin tone portion of the current image frame at the preset sampling frequency value. The beautification effect is performed that the image in the previewed image or video is stable and is not affected by shielding or an angle change.

Figure 4:
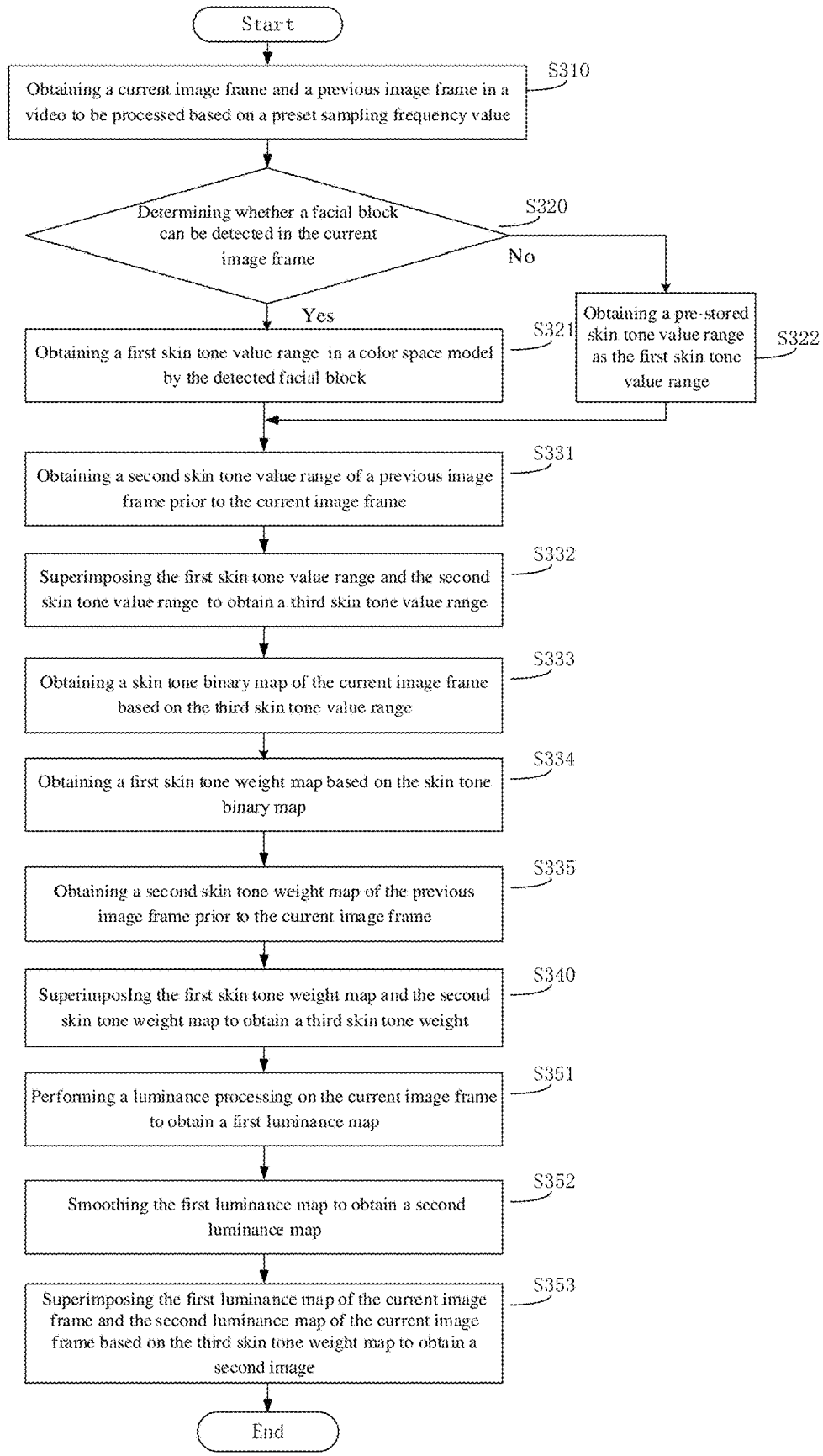
FIG. 4 is a flowchart of steps of a method for video processing according to a second embodiment of the present disclosure.

Referring to FIG. 4, which illustrates a flowchart of steps of a method for video processing according to a second embodiment of the present disclosure, the method for video processing includes following steps.

At step S310, a current image frame and a previous image frame in a video to be processed are obtained based on a preset sampling frequency value.

The specific steps of the step S310 are the same as those of step S210 in the first embodiment, and will not be described in detail herein.

At step S320, it is determined whether a facial block can be detected in the current image frame. In an implementation, Eigenface (face recognition) technology can be used to compare a pre-stored face model with the current image frame to determine whether an approximate position of the facial block, i.e., a region of interesting (ROI), can be detected in the current image frame. The obtaining method of the facial block is not limited, and other methods can also be used. At step S321, if the determining result is Yes, a first skin tone value range is obtained in a color space model by the detected facial block.

If a facial block is detected in the current image frame, the first skin tone value range is sampled from the facial block.

In one embodiment, the first skin tone value range is defined by a distribution range of each pixel value of the facial block in a YUV color space model.

In another embodiment, the first skin tone value range is defined by a distribution range of each pixel value of the facial block in a HSV/HSI color space model.

Figure 5A:
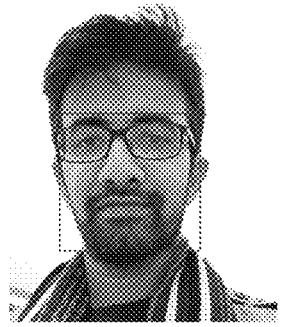
FIG. 5A is a schematic diagram of a facial block of an original image in a method for video processing according to an embodiment of the present disclosure.

Taking FIG. 5A as an example, FIG. 5A is a result diagram of the facial block.

At step S322, if the determining result is No, a pre-stored skin tone value range is obtained as the first skin tone value range.

The pre-stored value range is configured when there is no facial block is detected by using Eigenface technology or other technologies capable of recognizing a face area in the obtained current image frame.

At step S331, a second skin tone value range of a previous image frame prior to the current image frame is obtained.

The process of obtaining the second skin tone value range of the previous image frame of the current image frame is the same as of the process of obtaining the first skin tone value range of the current image frame, and details are not repeated herein again.

At step S332, the first skin tone value range and the second skin tone value range are superimposed to obtain a third a skin tone value range.

In order to avoid flickering of the beautification effect of the previewed image or captured videos, the third skin tone value range obtained by superimposing the first skin tone value range and the second skin tone value range needs to be updated in the skin tone range table according to the first skin tone value range of the current image and the second skin tone value range of the previous frame obtained at the preset sampling frequency value. In one embodiment, the superposition of the first skin tone value range and the second skin tone value range can be linear superposition. In another embodiment, the superposition of the first skin tone value range and the second skin tone value range an also be non-linear superposition.

At step S333, a skin tone binary map of the current image frame is obtained based on the third skin tone value range.

Figure 5B:
FIG. 5B is a schematic diagram of a skin tone binary map of an original image in a method for video processing according to an embodiment of the present disclosure.

After the third skin tone value range is obtained, the current image frame is scanned by using the third skin tone value range, and the third skin tone value range is configured as a threshold, and then binarization processing is performed on the current image frame based on the threshold. A pixel whose pixel value in an original image frame is within a skin tone value range is marked as the skin tone portion. A grayscale value of the pixels in the skin tone portion is configured to 0 such that the skin tone portion is presented in white, so as the skin tone binary map obtained. For example, FIG. 5B is a result diagram of a skin tone binary map. There is no limitation on the binarization processing of the current image frame, and other methods can also be adopted. However, it is not excluded that there is a black area in areas corresponding to the skin tone portions and there is a white area in areas corresponding to non-skin tone portions due to other influencing factors in the current image frame.

Further, when the image is captured, due to the influence of noise, etc., the conversion of the current image frame into a skin tone binary map will generate noise. That is, there are white areas in the areas corresponding to the non-skin tone portions. The noise caused by interference factors in the skin tone binary map is eliminated through erosion performed on the skin tone binary map.

At step S334, a first skin tone weight map is obtained based on the skin tone binary map.

After the skin tone binary map is obtained, the skin tone binary map is converted into the first skin tone weight map according to an Image Matting algorithm.

Figure 5C:
FIG. 5C is a schematic diagram of a skin tone weight map of an original image in a method for video processing according to an embodiment of the present disclosure.

Specifically, by using the skin tone binary map, a pixel value of a pixel representing the skin tone portion in the current image frame is compared with pixel values of its neighboring pixels in the current image frame, and a similarity degree between the pixel value of each pixel adjacent to the pixel of the skin tone portion and the pixel value of the pixel of the skin tone portion is calculated to obtain the first skin tone weight map. The pixel value in a skin tone weight map is a weight value a for representing the similarity degree. After the skin tone binary map is converted into a skin tone weight map, if a weight value of the skin tone portion is 1 and the skin tone binary map covers the non-skin tone area, the value of the binary map in the non-skin tone area will be corrected to a weight value approximate to 0. In one embodiment, a GrabCut algorithm in the Image Matting algorithm is configured to convert the skin tone binary map into the first skin tone weight map. In another embodiment, a Guided Filter in the Image Matting algorithm can also be configured to convert the skin tone binary map to the first skin tone weight map. For example, FIG. 5C is a result diagram of the obtained first skin tone weight map.

At step S335, a second skin tone weight map of the previous image frame prior to the current image frame is obtained. A process of obtaining the second skin tone weight map of the previous image frame prior to the current image frame is the same as the process of obtaining the first skin tone weight map of the current image frame, and details are not repeated herein again.

At step S340, the first skin tone weight map and the second skin tone weight map are superimposed to obtain a third skin tone weight.

Similarly, in order to avoid flickering of the beautification effect of the previewed image or captured videos, the third skin tone weight map obtained by superimposing the first skin tone weight map and the second skin tone weight map needs to be updated in the skin tone weight map according to the first skin tone weight map of the current image and the second skin tone weight map of the previous frame obtained at the preset sampling frequency value. In one embodiment, the superposition of the first skin tone weight map and the second skin tone weight map can be linear superposition. In another embodiment, the superposition of the first skin tone weight map and the second skin tone weight map can also be non-linear superposition.

At step S351, a luminance processing is performed on the current image frame to obtain a first luminance map.

In one embodiment, a grayscale image and a colorful image are extracted from the current image frame based on the YUV color space model. The extract grayscale image is composed of Y values of all pixels in a YUV color gamut to obtain the first luminance map containing a luminance value of each pixel.

In another embodiment, a grayscale image is extracted from the current image frame based on the HSV/HSI color space model, and the extracted grayscale image is composed of V/I values of all pixels in a HSV/HSI color gamut to obtain the first luminance map of the current image frame.

Figure 5D:
FIG. 5D is a schematic diagram of a first luminance map of an original image in a method for video processing according to an embodiment of the present disclosure.

For example, FIG. 5D is a result diagram of the first luminance map of the current image frame.

At step S352, the first luminance map is smoothed to obtain a second luminance map.

Figure 5E:
FIG. 5E is a schematic diagram of a second luminance map of an original image in a method for video processing according to an embodiment of the present disclosure.

In order to perform the beautification process for the current image frame, the first luminance map of the current image frame is smoothed to obtain a smoothed second luminance map. Refer to FIG. 5E, which is a result diagram of the second luminance map.

In one embodiment, the first luminance map is smoothed by configuring an Edge-Preserving Filter to obtain a second luminance map. For example, a Gaussian filter can be configured to perform Gaussian smoothing on the first luminance map. A median filter can also be configured to implement median filtering on the first luminance map. In addition, a dual-wave filter can also be configured to implement dual-wave filtering. There is no limitation on the smoothing method, and the smoothing can be performed in other ways.

At step S353, the first luminance map of the current image frame and the second luminance map of the current image frame are superimposed based on the third skin tone weight map to obtain a second image.

Since the smoothing process for the first luminance map is performed on all parts of the first luminance map, the smoothing process for the non-skin tone portion of the second luminance map is also performed. The beautification effect is achieved by the skin tone portion is performed the smoothing process. After the smoothing process, the details of the non-skin tones that do not need to be performed the smoothing process become blurred.

In order to obtain an image in which the skin tone portion is smooth but the non-skin tone portion remains original, the skin tone portion in the second luminance map is extracted and superimposed on a corresponding position in the first luminance map to obtain the second image. In the second image, the skin tone portion is a skin tone portion in a smoothed second luminance map, and the non-skin tone portion is an unprocessed non-skin tone portion in the first luminance map. In one embodiment, step S353 further includes following steps:

obtaining a first pixel value in the first luminance map, a second pixel value in the second luminance map, and a weight value in the third skin tone weight map;

obtaining a third pixel value of each pixel based on the first pixel value, the second pixel value and the weight value;

where for example, obtaining the third pixel value of each pixel based on $I(i)=\alpha(i) B(i)+(1-\alpha(i)) A(i)$, where i represents a pixel, $B(i)$ represents the second pixel value of the $i^{th}$ pixel in the second luminance map, $A(i)$ represents the first pixel value of the $i^{th}$ pixel in the first luminance map, $\alpha(i)$ represents a weight value of the $i^{th}$ pixel in the first luminance map, and $I(i)$ represents the third pixel value of the $i^{th}$ pixel; and obtaining the second image based on the third pixel value of each pixel.

The obtained second image is an image obtained after superimposing the first luminance map and the second luminance map. Therefore, the second image is also a luminance map, and a color image of the second image is obtained based on the color space model, thereby obtaining a final output color image of the current image frame after beautification process thereof.

It should be noted that after the step S310 of the method for video processing in the second embodiment, the method for video processing further includes step S250, step S251, and step S252 included in the method for video processing of the first embodiment. The specific implementation manner can be referred to the first embodiment, which is not described again here.

Figure 6:
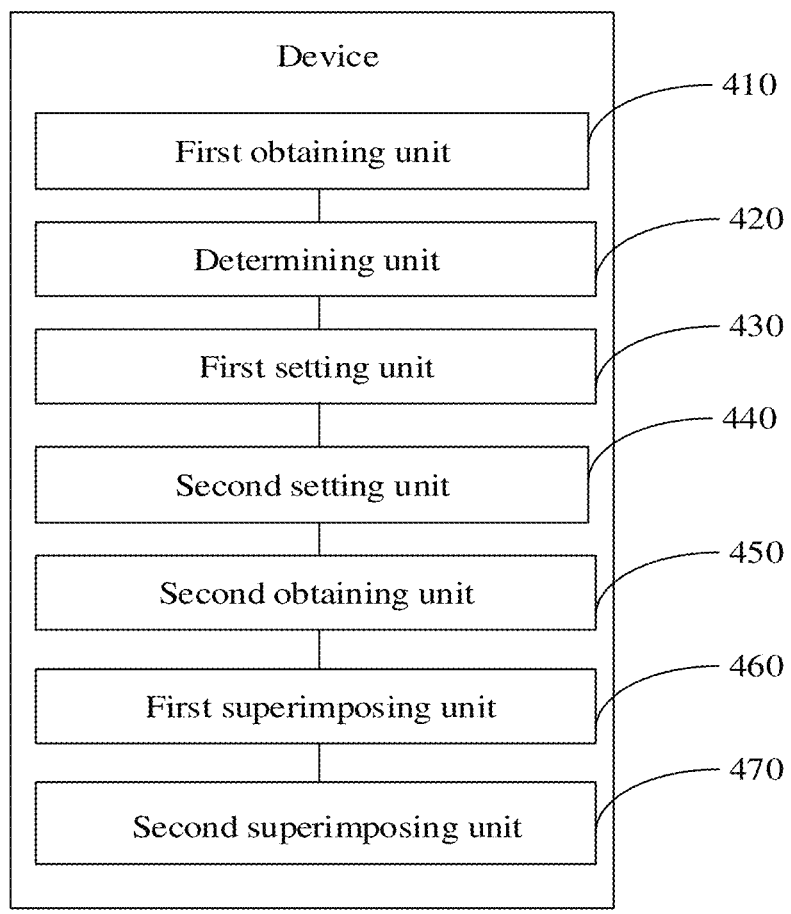
FIG. 6 is a schematic block diagram of a device for video processing according to an embodiment of the present disclosure.

Referring to FIG. 6, which is a schematic block diagram of a device for video processing according to a third embodiment of the present disclosure, the device for video processing includes following units.

A first obtaining unit 410 is configured to obtain a current image frame and a previous image frame in a video to be processed based on a preset sampling frequency value.

A determining unit 420 is configured to determine whether a preset event has occurred based on the current image frame and the previous image frame.

In one embodiment, the determining unit 420 includes:

a determining subunit configured to determine whether at least one of a facial block, a skin tone value range, or a number of faces has changed. When at least one of the facial block, the skin tone value range, or the number of faces has changed, it is determined that the preset event has occurred.

The determining subunit includes a fifth obtaining unit.

The fifth obtaining unit is configured to obtain a marked position of a facial block in the current image frame and a marked position of a facial block in the previous image frame. When a change rate between the marked position of the facial block in the current image frame and the marked position of the facial block in the previous image frame is greater than a preset value, it is determined that the facial block has changed.

A first setting unit 430 is configured to configure a first frequency value as the preset sampling frequency value when the preset event has not occurred.

A second setting unit 440 is configured to configure a second frequency value as the preset sampling frequency value when the preset event has occurred. The second frequency value is greater than the first frequency value.

The second obtaining unit 450 is configured to obtain a first skin tone weight map of the current image frame and a second skin tone weight map of the previous image frame.

In one embodiment, the second obtaining unit 450 includes a third obtaining unit, a third superimposing unit, and a fourth obtaining unit.

The third obtaining unit is configured to obtain a first skin tone value range of the current image frame and a second skin tone value range of the previous image frame.

The third superimposing unit is configured to superimpose the first skin tone value range and the second skin tone value range to obtain a third skin tone value range.

A fourth obtaining unit is configured to obtain a first skin tone weight map of the current image frame based on the third skin tone value range.

A first superimposing unit 460 is configured to superimpose the first skin tone weight map and the second skin tone weight map to obtain a third skin tone weight map.

A second superimposing unit 470 is configured to superimpose a first luminance map and a second luminance map of the current image frame to obtain a second image. The first luminance map is a luminance map of the current image frame. The second luminance map is a map obtained after the first luminance map is smoothed.

In summary, the method and the device for video processing, the electronic device and storage medium are provided by the present disclosure. The current image frame and the previous image frame are sampled based on the preset sampling frequency value. The first skin tone weight map of the current image frame and the second skin tone weight map of the previous image frame are obtained. The first skin tone weight map and the second skin tone weight map are superimposed to obtain the third skin tone weight map. The first luminance map and the second luminance map of the current image frame are superimposed to obtain the second image. The skin tone portion of the second image is smoothed, and the non-skin tone portion is kept original. The current image frame is sampled at the preset sampling frequency value, and the beautification is performed on the image by detecting the skin tone portion of the current image frame. The situation is avoided that the beautification algorithm cannot be implemented due to inability to detect the facial feature, so that the beautification effect of the previewed image or the captured video is sometimes absent.

In addition, during the process of obtaining previewed images, the preset sampling frequency value is adjusted in real time based on the specific situation by determining whether the preset event has occurred. When the preset event has not occurred, the preset sampling frequency value remains unchanged or decreases, which reduces the computing loading of the processor while allowing the beautification effect of the previewed images to be continuously presented. When the preset event has occurred, the preset sampling frequency value is increased to prevent the situation that the beautification effect cannot be continuously presented because the sampling frequency is too small.

In several embodiments provided in this application, it should be understood that the disclosed devices and methods can also be implemented in other ways. The device embodiments described above are merely illustrative. For example, the flowcharts and block diagrams in the accompanying drawings show architectures, functions, and operations which are capable of being implemented by devices, methods, and computer program products according to various embodiments of the present disclosure. In this regard, each block in the flowchart or block diagram can represent a module, a program segment, or a part of code, which contains one or more executable instructions for implementing a stipulated logical function. It should also be noted that in some alternative implementations, functions marked in the blocks can also occur in a different order from marked orders in the drawings. For example, two consecutive blocks can actually be executed substantially in parallel, and they can be executed in a reverse order sometimes, the order depending on functions involved. It should also be noted that each block in the block diagrams and/or flowcharts, and combinations of blocks in the block diagrams and/or flowcharts, can be implemented in a special hardware-based system that performs stipulated functions or actions, or can be implemented with a combination of special hardware and computer instructions.

In addition, various functional modules in various embodiments of the present disclosure can be integrated together to form an independent part, or each module can exist separately, or two or more modules can be integrated to form an independent part.

If the functions are implemented in a form of software function modules and sold or used as independent products, they can be stored in a computer readable storage medium. Based on such understanding, the essential of the technical solution of the present disclosure, a part of the technical solution that contributes to the existing technology, or a part of the technical solution can be embodied in the form of a software product. The computer software product is stored in a storage medium including multiple instructions causing the computer device (which can be a personal computer, a server, or a network device, etc.) to perform all or part of the steps of the method described in each embodiment of the present disclosure. The foregoing storage medium includes various media that can store program codes, such as a U disk, a mobile hard disk, a read-only memory (ROM), a random access memory (RAM), a magnetic disk, an optical disk, or the like. It should be noted that in the present disclosure, relational terms such as first, second, and so on, are used only to distinguish one entity or operation from another entity or operation, and do not necessarily require or imply that there is any such actual relationship or order among these entities or operations.

The term "comprising", "including" or any other variation thereof is intended to encompass non-exclusive inclusion, such that a process, method, article, or device that includes a series of elements includes not only those elements but also other elements that are not explicitly listed, or elements that are inherent to such process, method, article, or device. Without more restrictions, elements defined by the sentence "including a . . . " do not exclude an existence of other identical elements in the process, method, article, or equipment that includes the elements.

The above description is merely preferred embodiment of the present disclosure and is not intended to limit the present disclosure. For those skilled in the art, the present disclosure can have various modifications and changes. Any modification, equivalent replacement and improvement made within the spirit and principle of the present disclosure shall be included in the protection scope of the present disclosure. It should be noted that similar reference numerals and letters indicate similar items in the following drawings, so once one item is defined in one drawing, it is not necessary to further define and explain the item in subsequent drawings.

The above only illustrates specific embodiments of the present disclosure, but the protection scope of the present disclosure is not limited to this. Changes or replacements that can easily though of any person skilled in the art within the technical scope disclosed by the present disclosure should be covered by the protection scope of the present disclosure. Therefore, the protection scope of the present disclosure shall be subject to the protection scope of the claims.

It should be noted that in this article, relational terms such as first, second, and so on, are used only to distinguish one entity or operation from another entity or operation, and do not necessarily require or imply that there is any such actual relationship or order among these entities or operations. Moreover, the terms "including", "comprising", or any other variation thereof are intended to encompass non-exclusive inclusion, such that a process, method, article, or device that includes a series of elements includes not only those elements but also those that are not explicitly listed, or other elements inherent to such process, method, article, or device. Without more restrictions, elements defined by the sentence "including a . . . " do not exclude the existence of other identical elements in the process, method, article, or equipment that includes the elements.

What is claimed is:

1. A method for video processing, comprising:
    obtaining a current image frame and a previous image frame in a video to be processed based on a preset sampling frequency value;
    obtaining a first skin tone weight map of the current image frame and a second skin tone weight map of the previous image frame;
    superimposing the first skin tone weight map and the second skin tone weight map to obtain a third skin tone weight map; and
    superimposing a first luminance map of the current image frame and a second luminance map based on the third skin tone weight map to obtain a second image, wherein the first luminance map is a luminance map of the current image frame, and the second luminance map is a map obtained after the first luminance map is smoothed.

2. The method according to claim 1, further comprising:
    determining whether a preset event has occurred based on the current image frame and the previous image frame;
    configuring a first frequency value as the preset sampling frequency value in a case where the preset event has not occurred; and
    configuring a second frequency value as the preset sampling frequency value in a case where the preset event has occurred,
    wherein the second frequency value is greater than the first frequency value.

3. The method according to claim 2, wherein determining whether the preset event has occurred based on the current image frame and the previous image frame comprises:
    determining whether at least one of a facial block, a first skin tone value range or a number of faces has changed, the first skin tone value range being a skin tone value range corresponding to the current image frame; and
    determining that the preset event has occurred in a case where at least one of the facial block, the first skin tone value range, or the number of faces has changed.

4. The method according to claim 3, wherein determining whether the facial block has changed comprises:
    obtaining a marked position of the facial block in the current image frame and a marked position of the facial block in the previous image frame; and
    determining that the facial block has changed in a case where a rate of change between the marked position of the facial block in the current image frame and the marked position of the facial block in the previous image frame is greater than a preset value.

5. The method according to claim 1, wherein obtaining the first skin tone weight map of the current image frame comprises:

obtaining a first skin tone value range of the current image frame and a second skin tone value range of the previous image frame;

superimposing the first skin tone value range and the second skin tone value range to obtain a third skin tone value range; and obtaining the first skin tone weight map of the current image frame based on the third skin tone value range.

6. The method according to claim 1, wherein said determining whether the preset event has occurred based on the current image frame and the previous image frame occurs after said obtaining the current image frame and the previous image frame in the video to be processed based on the preset sampling frequency value.

7. An electronic device, comprising a processor; and a memory coupled to the processor through a bus; the memory storing a program, the processor calling the program stored in the memory through the bus to:

obtain a current image frame and a previous image frame in a video to be processed based on a preset sampling frequency value;

obtain a first skin tone weight map of the current image frame and a second skin tone weight map of the previous image frame;

superimpose the first skin tone weight map and the second skin tone weight map to obtain a third skin tone weight map; and superimpose a first luminance map of the current image frame and a second luminance map based on the third skin tone weight map to obtain a second image, wherein the first luminance map is a luminance map of the current image frame, and the second luminance map is a map obtained after the first luminance map is smoothed.

8. The electronic device according to claim 7, wherein the processor further calls the program stored in the memory through the bus to:

determine whether a preset event has occurred based on the current image frame and the previous image frame;

configure a first frequency value as the preset sampling frequency value in a case where the preset event has not occurred; and configure a second frequency value as the preset sampling frequency value in a case where the preset event has occurred, wherein the second frequency value is greater than the first frequency value.

9. The electronic device according to claim 8, wherein determining whether the preset event has occurred based on the current image frame and the previous image frame comprises:

determining whether at least one of a facial block, a first skin tone value range or a number of faces has changed, the first skin tone value range being a skin tone value range corresponding to the current image frame; and determining that the preset event has occurred in a case where at least one of the facial block, the first skin tone value range, or the number of faces has changed.

10. The electronic device according to claim 9, wherein determining whether the facial block has changed comprises:

obtaining a marked position of the facial block in the current image frame and a marked position of the facial block in the previous image frame; and determining that the facial block has changed in a case where a rate of change between the marked position of the facial block in the current image frame and the marked position of the facial block in the previous image frame is greater than a preset value.

11. The electronic device according to claim 7, wherein obtaining the first skin tone weight map of the current image frame comprises:

obtaining a first skin tone value range of the current image frame and a second skin tone value range of the previous image frame;

superimposing the first skin tone value range and the second skin tone value range to obtain a third skin tone value range; and obtaining the first skin tone weight map of the current image frame based on the third skin tone value range.

12. The electronic device according to claim 7, wherein said determining whether the preset event has occurred based on the current image frame and the previous image frame occurs after said obtaining the current image frame and the previous image frame in the video to be processed based on the preset sampling frequency value.

13. A non-transitory computer-readable medium, storing computer program instructions executable by a processor; the program instructions cause the processor to:

obtain a current image frame and a previous image frame in a video to be processed based on a preset sampling frequency value;

obtain a first skin tone weight map of the current image frame and a second skin tone weight map of the previous image frame;

superimpose the first skin tone weight map and the second skin tone weight map to obtain a third skin tone weight map; and superimpose a first luminance map of the current image frame and a second luminance map based on the third skin tone weight map to obtain a second image, wherein the first luminance map is a luminance map of the current image frame, and the second luminance map is a map obtained after the first luminance map is smoothed.

14. The non-transitory computer-readable medium according to claim 13, wherein the computer program instructions further cause the processor to:

determine whether a preset event has occurred based on the current image frame and the previous image frame;

configure a first frequency value as the preset sampling frequency value in a case where the preset event has not occurred; and configure a second frequency value as the preset sampling frequency value in a case where the preset event has occurred, wherein the second frequency value is greater than the first frequency value.

15. The non-transitory computer-readable medium according to claim 14, wherein determining whether the preset event has occurred based on the current image frame and the previous image frame comprises:
  determining whether at least one of a facial block, a first skin tone value range or a number of faces has changed, the first skin tone value range being a skin tone value range corresponding to the current image frame; and
  determining that the preset event has occurred in a case where at least one of the facial block, the first skin tone value range, or the number of faces has changed.

16. The non-transitory computer-readable medium according to claim 15, wherein determining whether the facial block has changed comprises:
  obtaining a marked position of the facial block in the current image frame and a marked position of the facial block in the previous image frame; and
  determining that the facial block has changed in a case where a rate of change between the marked position of the facial block in the current image frame and the marked position of the facial block in the previous image frame is greater than a preset value.

17. The non-transitory computer-readable medium according to claim 13, wherein obtaining the first skin tone weight map of the current image frame comprises:
  obtaining a first skin tone value range of the current image frame and a second skin tone value range of the previous image frame;
  superimposing the first skin tone value range and the second skin tone value range to obtain a third skin tone value range; and
  obtaining the first skin tone weight map of the current image frame based on the third skin tone value range.

18. The non-transitory computer-readable medium according to claim 13, wherein said determining whether the preset event has occurred based on the current image frame and the previous image frame occurs after said obtaining the current image frame and the previous image frame in the video to be processed based on the preset sampling frequency value.

* * * * *